UNITED STATES PATENT OFFICE.

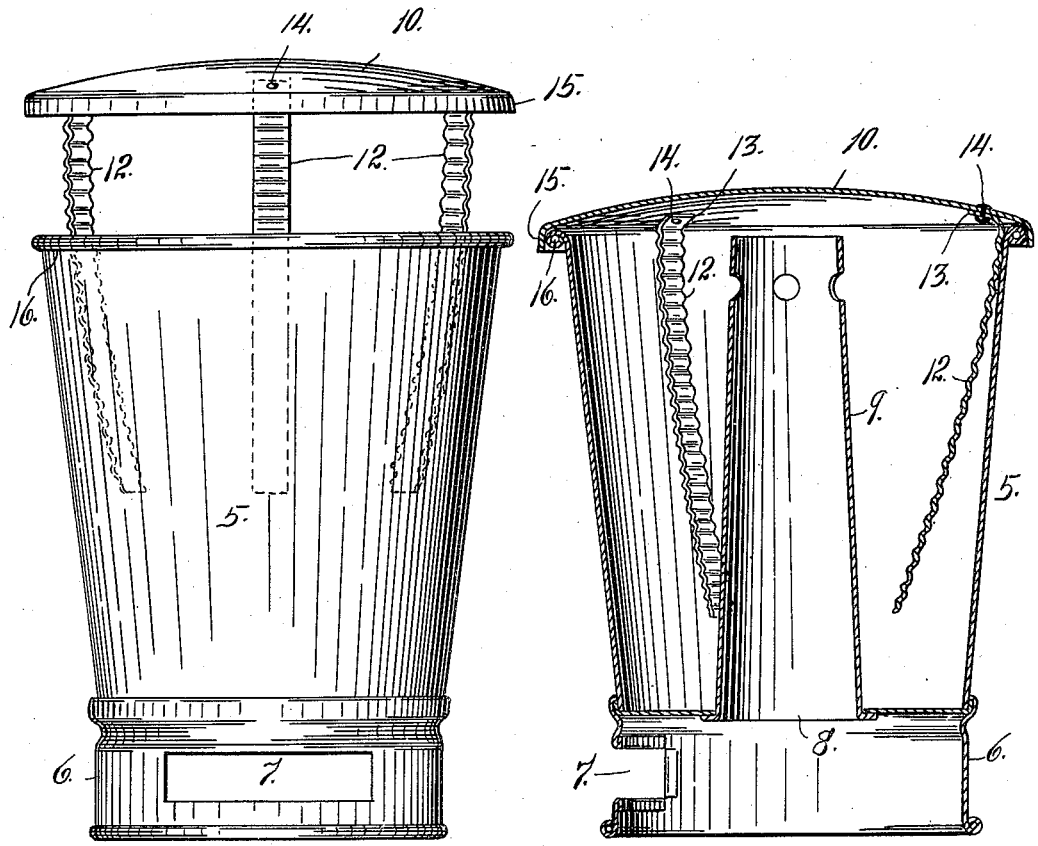
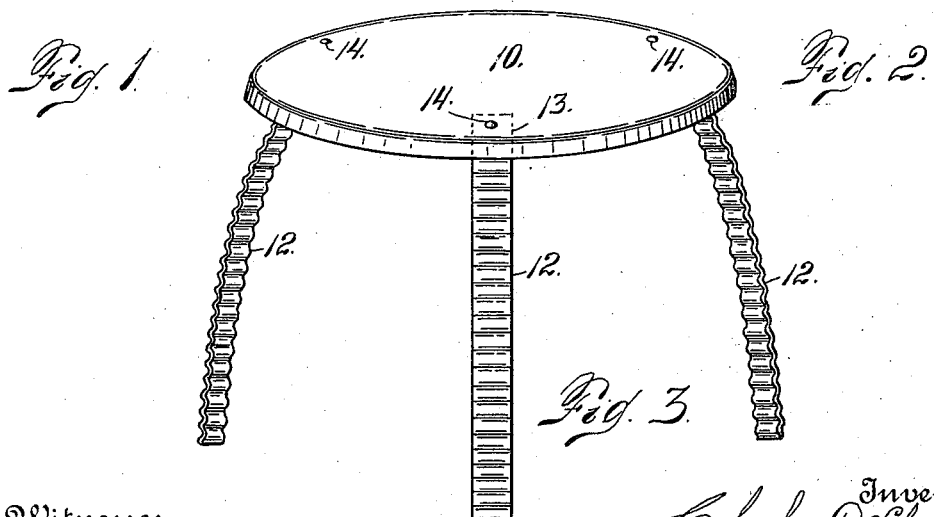

CHARLES D. SHAEFFER, OF CANON CITY, COLORADO, ASSIGNOR TO THE ROUND CREST ORCHARD HEATER COMPANY, OF CANON CITY, COLORADO, A CORPORATION OF COLORADO.

ORCHARD-HEATER.

1,010,323.   Specification of Letters Patent.   Patented Nov. 28, 1911.

Application filed December 24, 1909. Serial No. 534,892.

*To all whom it may concern:*

Be it known that I, CHARLES D. SHAEFFER, a citizen of the United States, residing at Canon City, county of Fremont, and State of Colorado, have invented certain new and useful Improvements in Orchard-Heaters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in orchard heaters, my object being to provide a device adapted both to close the liquid fuel receptacle of a device of this character when the same is not in use and which shall also serve as a controlling means for regulating the combustion when the device is in use and also for the purpose of deflecting the heat downwardly so that it may be effective in protecting fruit that grows close to the ground, as strawberries and other fruit or berries growing upon vines or small bushes.

The novel feature of the device may be applied to any fuel receptacle having a centrally located chimney and consists of a top having depending spring-legs adapted to engage the wall of the receptacle with sufficient tension to support the cover in the desired position of adjustment, the said cover being vertically adjustable to cause it to occupy a position at any desired height from the top or upper edge of the receptacle and above the upper end of the chimney. As shown in the drawing, this adjustable cover is shown in connection with a receptacle having a centrally located frustum-shaped chimney or tube open at both ends, the bottom of the tube registering with an opening in the bottom of the receptacle which communicates with a draft opening in the base of the receptacle. But it must be understood that the said cover may be employed in connection with other forms of fuel receptacles equipped with a chimney extending upwardly through the center of the receptacle.

Having briefly outlined my improved construction, I will proceed to describe the same in detail, reference being made to the accompanying drawing, in which is illustrated an embodiment thereof.

In this drawing: Figure 1 is a side elevation of a liquid fuel receptacle equipped with my improved vertically adjustable controlling disk or cover, the said cover being raised above the top of the receptacle to show its position when in use for heat-deflecting and combustion-controlling purposes. Fig. 2 is a central vertical section of a similar receptacle with the cover or disk shown in the closed position or that which it occupies when the device is not in use. Fig. 3 is a perspective view in detail of a disk or cover.

The same reference characters indicate the same parts in all the views.

Let the numeral 5 designate a fuel receptacle which is provided with a base 6 having a draft opening 7. This base projects below the bottom of the receptacle which is provided with an opening 8 communicating with a draft tube or chimney 9 centrally located in the receptacle and terminating a short distance below the upper edge of the same.

The numeral 10 designates a disk or cover which is provided with depending spring members 12 which are preferably transversely corrugated or roughened to increase the friction between the said members and the fuel receptacle, whereby the cover may be securely held in the desired position of adjustment against accidental displacement. These legs normally project outwardly beyond the periphery of the cover so that when the device is applied to the receptacle, the legs must be bent inwardly in order to bring them within the area of the top of the receptacle. By bending these legs inwardly they are placed under such tension that when released they will engage the inner wall of the receptacle with such tension as to retain the cover in the desired position. By virtue of the transverse corrugations with which the legs are provided, the legs serve to support the cover above the top of the receptacle with greater facility and when the legs are under less tension than would be the case if the latter were smooth.

As shown in the drawing the upper extremities of the legs are bent inwardly as shown at 13 and riveted to the cover on the inside as shown at 14. It is evident, however, that the legs may be secured to the cover in any suitable manner. Also as shown in the drawing the outer edge of the cover is provided with a depending flange 15, adapted to fit closely around a bead 16 with which the upper edge of the receptacle is provided, a sufficient space being left between the legs and the flange to receive the bead.

In the case of liquid fuel receptacles, it is necessary that they shall be charged or supplied with the necessary liquid fuel sometime in advance of the time when they are to be used; and it is necessary that provision shall be made to prevent dirt or impurities of any kind from entering the receptacle. Hence, when the device is not in use, the cover 10 will be shoved down to tightly close the top as shown in Fig. 2. When, however, it is desired to use the oil or other liquid fuel for fruit protecting purposes, the cover is raised to the desired height (see Fig. 1) and the legs 12 will support it in the position of adjustment above the top of the receptacle by virtue of their spring-tension, their holding capacity being also enhanced by the transverse corrugations, as heretofore explained. When thus used, the top or disk controls the draft, regulates combustion and deflects the heat downwardly for the protection of vegetation or fruit growing upon vines or occupying a relatively low position with reference to the ground. Of course without a controlling device the tendency of the heat is to rise rapidly and the greater the degree of combustion, or the more fuel consumed, the greater the rapidity with which the heat or hot air moves upwardly. However, by properly regulating my improved disk or cover, this hot air may be deflected downwardly and caused to spread out and effectually protect a relatively large surrounding area, whereby the temperature is raised sufficiently to prevent injury to the vegetation in the vicinity, which otherwise would be destroyed by frost or a destructive low degree of temperature.

By varying the distance between the upper end of the chimney 9 and the cover 10, the amount of air fed to the gases and products of combustion arising from the fuel may be controlled or varied to regulate the rate of combustion, and therefore, accordingly regulate the temperature in the vicinity of the heater.

Having thus described my invention, what I claim is:

1. The combination of a liquid fuel receptacle, having an open ended chimney communicating with the atmosphere at the bottom of the receptacle, a plate or cover vertically adjustable with respect to the upper end of the chimney and equipped with depending transversely corrugated spring legs rigidly secured to the cover at one extremity a sufficient distance from the flange of the cover to allow the upper edge of the receptacle to fit between the legs and the flange, the said legs having their opposite extremities free, the legs projecting into the receptacle and engaging the upper edge thereof for the purpose of supporting the cover in the desired position of vertical adjustment.

2. The combination with a liquid-fuel containing receptacle having a chimney extending upwardly therethrough, and in communication at its top with the receptacle and with the atmosphere at its bottom, of a controlling cover vertically adjustable to and from the upper extremity of the chimney, and equipped with depending transversely corrugated spring legs, rigidly secured at one extremity to the cover and at a sufficient distance from the outer edge of the cover to allow the cover beyond the legs to rest upon the edge of the receptacle, the said legs having their opposite extremities free, the legs projecting into the receptacle and engaging the interior of the receptacle for securing the said cover in the desired position of vertical adjustment, substantially as described.

In testimony whereof I affix my signature in presence of two witnesses.

CHARLES D. SHAEFFER.

Witnesses:
EUGENE A. BRADBURY,
MARY H. McQUOWN.